United States Patent Office 3,565,829
Patented Feb. 23, 1971

3,565,829
SUPPORTED CATALYSTS CONTAINING VANADIUM PENTOXIDE AND TITANIUM DIOXIDE
Wilhelm Friedrichsen, Ludwigshafen, and Otto Goehre, Wilhelmsfeld, Germany, assignors to Badische Anilin- & Soda-Fabrik Aktiengesellschaft, Ludwigshafen (Rhine), Germany
No Drawing. Filed Oct. 2, 1968, Ser. No. 764,623
Claims priority, application Germany, Oct. 4, 1967, P 16 42 938.2; July 25, 1968, P 17 92 123.2
The portion of the term of the patent subsequent to Sept. 2, 1989, has been disclaimed
Int. Cl. B01j 11/06, 11/32
U.S. Cl. 252—464　　12 Claims

ABSTRACT OF THE DISCLOSURE

Supported catalysts containing vanadium pentoxide and titanium dioxide for oxidation reaction, for example for the production of phthalic anhydride from o-xylene, which contain additions of aluminum oxide and/or lithium oxide and/or zirconium dioxide.

---

The present invention relates to new supported catalysts containing vanadium pentoxide and titanium dioxide which are particularly suitable for the oxidation of aromatic and unsaturated aliphatic hydrocarbons to carboxylic acids and carboxylic anhydrides.

Supported catalysts which consists of an inert non-porous carrier material and an active catalyst composition containing vanadium pentoxide and titanium dioxide applied in a thin layer thereto are known from our co-pending U.S. patent application Ser. No. 548,404, filed May 9, 1966, now U.S. Pat. No. 3,464,930.

Since these catalysts, in spite of other outstanding properties, do not achieve their optimum effect until after a certain operational period, the present invention has for its object to improve the prior art catalysts so that they reach their effect optimum shortly after commencement of the oxidation reactions concerned.

We have now found supported catalysts of inert non-porous carrier material and, applied thereto, a thin layer of active composition containing vanadium pentoxide and titanium dioxide which have the desired properties and wherein the active composition consists substantially of a mixture of 1 to 40 parts by weight of vanadium pentoxide and 60 to 99 parts by weight of titanium dioxide and also 0.01 to 50% by weight (with reference to the total amount of vanadium pentoxide and titanium dioxide=100%) of aluminum oxide, lithium oxide and/or zirconium dioxide or an equivalent amount (as regards aluminum, lithium or zirconium) of another aluminum, lithium or zirconium compound, the content of lithium not being more than 10% by weight (regarded as lithium oxide) and the content of vanadium pentoxide in the supported catalyst consisting of active composition and carrier material being from 0.05 to 3% by weight.

Those catalysts are preferred in which the content of lithium oxide is from 0.01 to 5% by weight, particularly from 0.01 to 3% by weight and/or in which the content of zirconium dioxide is from 0.1 to 50%, particularly 0.1 to 25%, by weight and/or in which the content of aluminum oxide is from 0.01 to 25% by weight, particularly 0.01 to 10% by weight, and in which these oxides may be replaced by equivalent amounts of other lithium or zirconium compounds as stated above.

Suitable lithium compounds, apart from lithium oxide, include lithium hydroxide, lithium halides, lithium carbonate, lithium sulfate, lithium nitrate, lithium phosphates, lithium formate, lithium acetate and lithium oxalate or mixtures of these compounds.

Examples of zirconium compounds (other than zirconium dioxide) are zirconium halides, zirconium oxyhalides, zirconium sulfate, zirconium formate, zirconium oxalate and zirconium acetate.

Equivalent molar amounts of other aluminum compounds which are converted into aluminum oxide at up to about 600° C. in the presence of air or oxygen may be used instead of aluminum oxide in the production of the supported catalysts. Examples of such compounds are aluminum hydroxide, nitrate, carbonate, oxalate, formate and acetate.

According to previous observations and effect of the presence of aluminum oxide is that the oxidation reaction proceeds more completely than before up to the stage of carboxylic acids and carboxylic anhydrides without these products being attacked in turn. This means for example in the case of the production of phthalic anhydride from orthoxylene or naphthalene that the formation of the undesirable phthalide (which it is difficult to separate) is kept down to about one tenth of the previous amount.

If particular importance is attached to the said selectivity of the supported catalysts according to this invention, it is advisable to replace lithium oxide and zirconium oxide wholly by aluminum oxide. Moreover it is advantageous for the molar amount of aluminum oxide to be less than that of vanadium pentoxide and preferably to be 3 to 50 mole percent, i.e. less than 62 parts of aluminum oxide and preferably from about 2 to 30 parts by weight to 100 parts by weight of vanadium pentoxide.

As far as can be determined, it is only aluminium, lithium and zirconium which have an effect on the properties of the catalyst and not the anions in these compounds which under the conditions of the oxidation reactions are for the most part converted into oxides in any case. There is practically an unlimited choice of these anions of the aluminum, lithium and zirconium salts.

The preferred modification of titanium dioxide is anatase. Non-porous inert substances such as quarz, porcelain, magnesium oxide, silicon carbide, rutile, silicates such as aluminum, magnesium, zirconium and cerium silicates or aluminas, either in crystalline, amorphous or sintered state, are suitable as carrier materials. The porosity of the carrier materials should preferably correspond to an internal surface area of not more than 3, particularly not more than 0.5 m.²/g.

It is particularly advantageous to use the carrier material in the form of granules, cones, pellets, rings and the like, preferably in the form of balls which may have a diameter of from 4 to 10 mm. The thickness of the layer of the active composition on the carrier material is preferably from 0.01 to 3.00 mm.

In addition to the components of the active composition which are essential according to this invention (vanadium pentoxide, titanium dioxide and aluminium and/or lithium and/or zirconium compounds) the active compositions may contain minor amounts, for example up to 15% by weight of the content of vanadium pentoxide and titanium dioxide (=100%), of other substances, for example compounds of iron, nickel, cobalt, manganese, tin, silver, copper, chromium, molybdenum, tungsten, iridium, niobium, arsenic, antimony or phosphorus, preferably in the form of oxides.

Various known methods may be used for the production of the supported catalysts. For example an aqueous suspension of the components for the active composition, with or without thickeners such as alginates or polyacrylates, may be applied to the carrier material for example by intimate mixing in a pill coating machine at 150° to 500° C., preferably 250° to 500° C. Wettability of the carrier material may often be increased by adding organic liquids which are soluble in water such as alcohols or dimethylformamide to the suspension. The bond strength between the active catalyst composition and the carrier material can be improved by etching the latter, for example with hydrofluoric acid or compounds which give off hydrogen fluoride, such as ammonium fluoride. Additions of urea, thiourea or ammonium thiocyanate to the active composition to be applied also have a favorable effect on the bond strength of the active composition to the carrier material.

It is not necessary to start from vanadium pentoxide or titanium dioxide in the production of the active composition. Rather the corresponding amount of a salt, for example the oxalate, may be used and the vanadium pentoxide or titanium dioxide then developed therefrom in the coated carrier material by oxidation with air at temperatures of from 350° to 600° C., especially at up to 550° C.

Another possibility for coating the carrier material with the active composition consists in applying to the carrier material in a pill coating drum the constituents of the active composition at 150° to 500° C. from a melt of an organic substance, for example ammonium thiocyanate and then heating the catalyst in a stream of air so that the organic substance is volatilized or burnt and the vanadium pentoxide and titanium dioxide may be formed because compounds of vanadium or titanium other than the oxides have been used as starting material.

Supported catalysts according to this invention are suitable for the acceleration and control of organic oxidation reactions, particularly for the oxidation of aromatic or unsaturated aliphatic hydrocarbons to carboxylic acids and carboxylic anhydrides. These catalysts have particular large scale importance for the production of phthalic anhydride from naphthalene or o-xylene and also for the production of maleic anhydride from benzene, butenes or butadiene or for the production of pyromellitic anhydride from durene.

The oxidation reactions may be carried out in the conventional manner as when using conventional catalysts, for example by passing a gaseous mixture of the hydrocarbon to be oxidized with oxygen or a gas containing oxygen such as air over the supported catalyst, advantageously in a tube kiln, at atmospheric or superatmospheric pressure and at temperatures of from 350° to 450° C. The catalysts may also be used in a fluidized bed.

The catalysts according to the invention have a particularly long life and they reach their efficiency optimum soon after commencement of the oxidation reactions carried out therewith. The invention is illustrated by the following examples.

EXAMPLE 1

2500 g. of magnesium silicate balls having a diameter of 6 mm. in a pill coating drum heated to 300° C. are sprayed with 400 g. of an aqueous suspension which has been prepared from water, 42.5 g. of formamide, 18.7 g. of oxalic acid, 8.5 g. of vanadium pentoxide, 133 g. of anatase and 0.3 g. of lithium acetate (equivalent to 0.15 g. of lithium oxide). The proportion of non-volatile active constituents of the catalyst composition is accordingly about 142 g. of which 103 g. has been taken up by the balls. The proportion of the active composition in the supported catalyst is 3.9% by weight and the proportion of vanadium pentoxide is about 0.24% by weight. The lithium oxide content is about 0.13% by weight of the content of vanadium pentoxide and titanium dioxide and the mean thickness of the layer of catalyst composition on the balls is about 0.05 mm.

After the coating, the supported catalyst is heated for one hour at 450° C. in a stream of air and it is then ready for use.

The following test illustrates the activity of this supported catalyst:

A mixture of 2000 liters of air and 83 g. of vaporous orthoxylene having a purity of 98% is passed per hour at 400° C. through a tube having a diameter of 25 mm. and a length of 3 meters which is filled with the supported catalyst.

Phthalic anhydride and maleic anhydride are obtained in a weight ratio of 1:0.059 in a yield by weight (calculated on the amount of pure orthoxylene=100%) of 108.3% on the first day and of 111.0% from the second day, remaining constant. This equilibrium condition is not set up until the fifteenth day with a catalyst of comparable character which is devoid of lithium.

EXAMPLE 2

A supported catalyst is prepared in the manner described in Example 1 but the 0.3 g. of lithium acetate is replaced by 0.58 g. of zirconium dioxide. The zirconium dioxide content is about 0.4% of the content of vanadium pentoxide and titanium dioxide.

The yield of phthalic anhydride achievable with this catalyst by oxidation of o-xylene under the experimental conditions given in Example 1 are 109.2% on the first day and 111.5% from the second day onwards. With the corresponding catalyst devoid of zirconium, the value 111.0% is not reached until after two weeks.

EXAMPLE 3

2500 g. of magnesium silicate balls having a diameter of 6 mm. are sprayed in a pill coating drum heated to 300° C. with 400 g. of an aqueous suspension consisting of water, 42.5 g. of formamide, 18.7 g. of oxalic acid, 8.5 g. of vanadium pentoxide, 133 g. of anatase and 1.6 g. of crystalline aluminum nitrate (equivalent to 0.22 g. of $Al_2O_3$). 140 g. of this composition is taken up by the balls so that the proportion of the active composition in the supported catalyst is about 5.3% by weight. The active composition contains 0.16% of $Al_2O_3$.

After the balls have been coated they are heated for an hour in a stream of air at 450° C. and the catalyst is then ready for use.

A tube having a diameter of 25 mm. and a length of 3 meters is filled with the balls. 5100 liters of air and 204 g. of a 95% orthoxylene are passed per hour through the reaction tube. The tube is in a bath of saltpeter which is kept at 395° C.

112% by weight of phthalic anhydride is obtained, calculated on pure xylene. Besides 3.6% by weight of maleic anhydride, only 0.01% of phthalide is obtained.

If the said amount of aluminum nitrate is not added to the catalyst, a product having 0.08 to 0.1% of phthalide is obtained with the same yield.

What we claim is:

1. A supported catalyst for oxidation reactions comprising an inert non-porous carrier material and an active composition applied thereto in a thin layer, said active composition consisting essentially of a mixture of (a) 1 to 40 parts by weight of vanadium pentoxide with 60 to 99 parts by weight of titanium dioxide and (b) 0.01 to 50% by weight, with reference to the total amount of vanadium pentoxide and titanium dioxide, of an oxide selected from the class consisting of a aluminum oxide, lithium oxide, zirconium dioxide and mixtures thereof, the content of aluminum oxide is from 0.01 to 10% by weight with reference to the total amount of vanadium pentoxide and titanium dioxide, and the vanadium pentoxide content of the supported catalyst with reference to the total amount of carrier material and active composition being from 0.05 to 3% by weight.

2. A supported catalyst as claimed in claim 1 wherein the content of aluminum oxide is from 0.01 to 10% by weight of the total amount of vanadium pentoxide and titanium dioxide.

3. A supported catalyst as claimed in claim 1 wherein the content of lithium oxide is from 0.01 to 5% by weight of the total amount of vanadium pentoxide and titanium dioxide.

4. A supported catalyst as claimed in claim 1 wherein the content of zirconium dioxide is from 0.1 to 50% by weight of the total amount of vanadium pentoxide and titanium dioxide.

5. A supported catalyst as claimed in claim 1 wherein titanium dioxide is used in the anatase modification.

6. A supported catalyst as claimed in claim 1 wherein the carrier material is in the form of balls having a diameter of from 4 to 10 mm.

7. A supported catalyst as claimed in claim 1 wherein the content of lithium oxide is from 0.01 to 3% by weight of the total amount of vanadium pentoxide and titanium dioxide.

8. A supported catalyst as claimed in claim 1 wherein the content of zirconium dioxide is from 0.1 to 25% by weight of the total amount of vanadium pentoxide and titanium dioxide.

9. A supported catalyst as claimed in claim 1 wherein from about 2 to 30 parts by weight of aluminum oxide is present for each 100 parts by weight of vanadium pentoxide.

10. A supported catalyst as claimed in claim 1 wherein the internal surface area of the carrier material is not more than 3 m.²/g.

11. A supported catalyst as claimed in claim 10 wherein the said area is not more than 0.5 m.²/g.

12. A supported catalyst as claimed in claim 1 wherein the thickness of the layer of active composition is from 0.01 to 3.00 mm.

References Cited

UNITED STATES PATENTS

| | | | |
|---|---|---|---|
| 1,709,853 | 4/1929 | Jaeger | 260—603 |
| 1,909,354 | 5/1933 | Jaeger | 260—533 |
| 2,698,306 | 12/1954 | Matejczuyk | 252—464 |
| 3,464,930 | 9/1969 | Friedrichsen | 252—469 |
| 2,206,377 | 7/1940 | Weiss | 260—533 |
| 3,055,842 | 9/1962 | Robinson | 252—461 |

DANIEL E. WYMAN, Primary Examiner

P. M. FRENCH, Assistant Examiner

U.S. Cl. X.R.

252—461; 260—533

PO-1050
(5/69)

UNITED STATES PATENT OFFICE
CERTIFICATE OF CORRECTION

Patent No. 3,565,829      Dated February 23, 1971

Inventor(s) Wilhelm Friedrichsen et al

It is certified that error appears in the above-identified patent and that said Letters Patent are hereby corrected as shown below:

Column 4, line 62, Claim 1, "aluminum oxide is from 0.01 to 10%" should read -- lithium oxide being not more than 10% --

Signed and sealed this 22nd day of June 1971.

(SEAL)
Attest:

EDWARD M. FLETCHER, JR.
Attesting Officer

WILLIAM E. SCHUYLER, JR.
Commissioner of Patents